(12) United States Patent
Owens et al.

(10) Patent No.: US 6,910,896 B1
(45) Date of Patent: Jun. 28, 2005

(54) MECHANICAL LUNGS

(75) Inventors: John E. Owens, Oak Lawn, IL (US); Scott M. Milkovich, Glen Ellyn, IL (US); Daniel K. Stool, Addison, IL (US); Patrick Doherty, Arlington Heights, IL (US)

(73) Assignee: Ram Consulting, Inc., Oakbrook, IL (US)

( * ) Notice: Subject to any disclaimer, the term of this patent is extended or adjusted under 35 U.S.C. 154(b) by 377 days.

(21) Appl. No.: 10/014,421

(22) Filed: Dec. 14, 2001

Related U.S. Application Data
(60) Provisional application No. 60/255,430, filed on Dec. 15, 2000.

(51) Int. Cl.[7] ............................................. G09B 23/28
(52) U.S. Cl. ...................................... 434/267; 600/300
(58) Field of Search ............................... 434/262–265, 434/271, 307 R, 365, 267; 600/300

(56) References Cited

U.S. PATENT DOCUMENTS

| | | | | |
|---|---|---|---|---|
| 4,167,070 A | * | 9/1979 | Orden | 434/272 |
| 4,828,501 A | * | 5/1989 | Ingenito et al. | 434/265 |
| 5,403,192 A | * | 4/1995 | Kleinwaks et al. | 434/272 |
| 5,584,701 A | * | 12/1996 | Lampotang et al. | 434/272 |
| 5,975,748 A | * | 11/1999 | East et al. | 703/6 |
| 6,296,490 B1 | * | 10/2001 | Bowden | 434/265 |

* cited by examiner

*Primary Examiner*—Xuan M. Thai
*Assistant Examiner*—Kathleen M. Christman
(74) *Attorney, Agent, or Firm*—McGuireWoods LLP

(57) ABSTRACT

An apparatus is provided for simulating and monitoring a respiration pattern of a human. The apparatus generally includes a reservoir having an outlet, and actuator disposed in the reservoir for moving fluid in and out of the reservoir, and a control unit coupled to the actuator for controlling the actuator to simulate and monitor a respiration pattern of a human. Also, a method is provided for simulating and monitoring a respiration pattern of a human. The method includes steps of generating a waveform defining the respiration pattern and controlling an actuator to move fluid in and out of a reservoir based on the waveform. The apparatus and method can accurately simulate and monitor a respiration pattern of a human, especially an infant and a young child, and offer a flexibility to stimulate variety of respiration patterns.

16 Claims, 9 Drawing Sheets

| | | AGE YEARS | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| LUNG CAPACITY | | | | | | | | | | | | | |
| TOTAL LUNG CAPACITY | TLC (ml) | 633 | 923 | 1213 | 1340 | 1467 | 1802 | 2138 | 2473 | 2798 | 3123 | 3448 | 3773 |
| VITAL CAPACITY | VC (ml) | 475 | 693 | 910 | 1005 | 1100 | 1352 | 1603 | 1855 | 2099 | 2343 | 2586 | 2830 |
| RESIDUAL VOLUME | RV (ml) | 158 | 231 | 303 | 335 | 367 | 451 | 534 | 618 | 700 | 781 | 862 | 943 |
| TLC=VC+RV | | | | | | | | | | | | | |
| RV=0.25 * TLC | | | | | | | | | | | | | |
| NORMAL RESPIRATION | | | | | | | | | | | | | |
| FUNCTIONAL RESIDUAL CAPACITY | FRC (ml) | 263 | 398 | 532 | 596 | 660 | 831 | 1003 | 1174 | 1344 | 1515 | 1685 | 1855 |
| TIDAL VOLUME | VT (ml) | 78 | 95 | 112 | 121 | 130 | 147 | 163 | 180 | 200 | 220 | 240 | 260 |
| INSPIRATORY CAPACITY | IC (ml) | 370 | 526 | 681 | 744 | 807 | 971 | 1135 | 1299 | 1454 | 1609 | 1764 | 1918 |
| INSPIRATORY RESERVE VOLUME | IRV (ml) | 292 | 431 | 569 | 623 | 677 | 824 | 972 | 1119 | 1254 | 1389 | 1524 | 1658 |
| FREQUENCY (CYCLES/MINUTE) | f | 24 | 23 | 22 | 21 | 20 | 19 | 19 | 18 | 18 | 17 | 17 | 16 |
| TLC=FRC+IC | | | | | | | | | | | | | |
| TLC=FRC+VT+IRV | | | | | | | | | | | | | |
| IC=VT+IRV | | | | | | | | | | | | | |
| FRC=0.50 * TLC (UPRIGHT) | | | | | | | | | | | | | |
| FRC=0.40 * TLC (SUPINE) | | | | | | | | | | | | | |
| FORCEFUL EXHALATION | | | | | | | | | | | | | |
| EXPIRATORY RESERVE VOLUME | ERV (ml) | 105 | 167 | 229 | 261 | 293 | 381 | 468 | 556 | 645 | 734 | 823 | 912 |
| FREQUENCY (CYCLES/MINUTE) | f | | | | | | | | | | | | |
| TLC=IC+ERV+RV | | | | | | | | | | | | | |
| VC=ERV+IC | | | | | | | | | | | | | |

| CALIBRATION (MODEL LUNGS AND LINEAR ACTUATOR) | POSITION (INCHES) | VOLTAGE (V) | VOLUME (ml) | TOT VOLUME (ml) |
|---|---|---|---|---|
| BASELINE (0.00-INCHES, 0.0 VOLTS) | 0.00 | 0.00 | 80 | 160 |
| FULLY EXTENDED (6.00-INCHES, 5.0 VOLTS) | 6.00 | 5.00 | 995 | 1990 |
| V/ml | | | 0.0055 | 0.0027 |
| ml/V | | | 183 | 366 |

NOTE: VOLUME = THE VOLUME OF 1 LUNG,
TOT VOL = THE VOLUME OF BOTH LUNGS

CONTINUED FROM FIG. 7

NORMAL RESPIRATION CYCLE

| | | 2.500 | 2.609 | 2.727 | 2.857 | 3.000 | 3.103 | 3.214 | 3.333 | 3.429 | 3.529 | 3.636 | |
|---|---|---|---|---|---|---|---|---|---|---|---|---|---|
| TOTAL TIME (T RESPIRATION CYCLE) | Tot (SEC) | 2.500 | 2.609 | 2.727 | 2.857 | 3.000 | 3.103 | 3.214 | 3.333 | 3.429 | 3.529 | 3.636 | |
| INSPIRATORY TIME (T1), RAMP 38.06% | T1 (SEC) | 0.952 | 0.993 | 1.038 | 1.087 | 1.142 | 1.181 | 1.223 | 1.269 | 1.305 | 1.343 | 1.384 | |
| EXPIRATORY TIME (TE-T3), SINE DECAY 50% | T2 (SEC) | 1.250 | 1.304 | 1.364 | 1.429 | 1.500 | 1.552 | 1.607 | 1.667 | 1.714 | 1.765 | 1.818 | |
| PAUSE (TE-T2), DC LEVEL, 11.94% | T3 (SEC) | 0.299 | 0.311 | 0.326 | 0.341 | 0.358 | 0.371 | 0.384 | 0.398 | 0.409 | 0.421 | 0.434 | |
| PROGRAM SETTINGS: | | | | | | | | | | | | | |
| RAMP | | | | | | | | | | | | | |
| START | RS (V) | 0.2814 | 0.6489 | 1.0164 | 1.1913 | 1.3661 | 1.8342 | 2.3024 | 2.7705 | 3.2257 | 3.7008 | 4.1660 | |
| END | RE (V) | 0.4945 | 0.9085 | 1.3224 | 1.5219 | 1.7213 | 2.2350 | 2.7486 | 3.2623 | 3.7821 | 4.3019 | 4.8217 | |
| SINE | | | | | | | | | | | | | |
| AMPLITUDE | SA (V) | 0.1066 | 0.1298 | 0.1530 | 0.1653 | 0.1776 | 0.2004 | 0.2231 | 0.2459 | 0.2732 | 0.3005 | 0.3279 | |
| OFFSET | SO (V) | 0.3880 | 0.7787 | 1.1694 | 1.3566 | 1.5437 | 2.0346 | 2.5255 | 3.0164 | 3.5089 | 4.0014 | 4.4939 | |
| FREQ | SF (Hz) | 0.4000 | 0.3833 | 0.3667 | 0.3500 | 0.3333 | 0.3222 | 0.3111 | 0.3000 | 0.2917 | 0.2833 | 0.2750 | |
| PHASE | SP (deg) | 90 | 90 | 90 | 90 | 90 | 90 | 90 | 90 | 90 | 90 | 90 | |
| DC LEVEL | | | | | | | | | | | | | |
| OFFSET | DO (V) | 0.2814 | 0.6489 | 1.0164 | 1.1913 | 1.3661 | 1.8342 | 2.3024 | 2.7705 | 3.2257 | 3.7008 | 4.1660 | |

*FIG. 7 CONT.*

MECHANICAL LUNGS

CROSS REFERENCE TO RELATED APPLICATION

This patent application claims the benefit of priority from U.S. Provisional Application No. 60/255,430 filed on Dec. 15, 2000, the complete disclosure of which is incorporated herein by reference.

FIELD OF THE INVENTION

The present invention relates to an apparatus and method for simulating and monitoring a respiration pattern of a human. More particularly, the invention is directed to an apparatus and method for simulating and monitoring a respiration pattern to assess suffocation risk of products and apparel on children.

BACKGROUND OF THE INVENTION

Each year, many children lose their lives due to suffocation. One study shows that 54% of fatalities to children under the age of fourteen are caused by suffocation. When a child suffers from suffocation, it is likely to result in a fatal injury more than eighteen times than a non-fatal injury. Injuries from suffocation are largely categorized into two types: mechanical resistance to a passage of air and asphyxia. Both flexible and rigid materials can provide mechanical resistance to an air passage of a child. Mechanical resistance is often created when the oropharynx and/or the nasopharynx of a child is blocked externally by an object. For example, children have been suffocated by plastic bags, inflatable toys, and stacking cups. Asphyxia is suffocation caused by physiological responses to a lack of oxygen and an excess level of carbon dioxide in the body. Asphyxia occurs as a consequence of suffocation.

FIG. 1 of the accompanying drawings illustrates an inhalation mechanism 1 of a human 2. During inhalation, the diaphragm in the human body is forcefully lowered (in the direction indicated by the arrow 3) creating a negative pressure in the lungs. At the same time, air enters through the mouth 4 and/or nose 5 to the lungs. The air encounters flow resistance in the oropharynx 6 or the nasopharynx 7.

FIG. 2 illustrates an exhalation mechanism 8. During exhalation, the diaphragm is relaxed upwards (in the direction indicated by the arrow 9), creating a positive pressure in the lungs. Simultaneously, air in the lungs exits through the mouth 4 and/or nose 5. The existing air encounters flow resistance in the oropharynx 6 or the nasopharynx 7.

FIG. 3 illustrates a graph of a respiratory cycle of a human. The horizontal and vertical axes of the graph indicate time and volume, respectively. A respiratory cycle consists of inhalation and exhalation followed by a pause. A respiratory frequency $f$ can be determined from the respiratory cycle. The inhalation takes place during inspiratory time $T_1$, and is represented by a ramp function. The exhalation takes place during expiratory time $T_2$ and is represented by a sine decay function. A tidal volume $V_T$ indicates a volume of air inhaled and exhaled by a human. A respiration pattern consists of one or more of respiratory cycles. Total time $T_{tot}$ for a respiratory cycle includes the inspiratory time, expiratory time, and pause.

In the past, some testing has been conducted on products and apparel to assess risk of suffocation by children. To accurately assess the suffocation risk, a breathing or respiration pattern of a child must be accurately simulated. However, it is difficult to accurately simulate a respiration pattern of a child since the pattern depends on many factors, such as activities, age, and gender of the child. For example, infants usually breathe through their nasal passages. During the crying, however, the nasal passage of an infant is often blocked and the infant may breathe through the oral cavities. Also, a one-year-old infant may be capable of producing a respiratory pressure (intrathoracic pressure) of up to 30 cm $H_2O$ for a brief period of time. On the other hand, a young child may be able to produce a respiratory pressure of 15 cm $H_2O$ for an extended period of time.

Also, a respiration pattern under different levels of occlusion must be accurately simulated. When a blockage causes complete occlusion to a child and the blockage is not removed, the child will likely to die after two or three minutes. When a blockage causes partial occlusion to a child, the child may survive for a longer period of time depending on the level of the occlusion, strength, endurance, age, and sleep state of the child. In addition, protective mechanisms of a child against suffocation differ based on many factors.

Consequently, a need exists for an apparatus and method capable of accurately simulating and monitoring a respiration pattern of a human, especially an infant and a young child, and offering a flexibility to simulate various respiration patterns.

SUMMARY OF THE INVENTION

In accordance with the invention, an apparatus is provided for simulating and monitoring a respiration pattern of a human. The apparatus generally includes a reservoir having an outlet an actuator disposed in the reservoir for moving fluid in and out of the reservoir, and a control unit coupled to the actuator for controlling the actuator to simulate a respiration pattern of a human.

In another aspect, a method is provided for simulating and monitoring a respiration pattern of a human. The method generally includes steps of generating a waveform defining the respiration pattern and controlling an actuator to move fluid in and out of a reservoir based on the waveform.

Advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several exemplary embodiments of the invention and together with the description, serve to explain the principles of the invention.

FIG. 7 is a char including respiratory physiology in infants and children based on their age.

DESCRIPTION OF THE EMBODIMENTS

Reference will now be made in detail to the exemplary embodiments of the invention, which are illustrated in the accompanying drawings. Wherever possible, the same reference numbers will be used throughout the drawings to designate the same or like parts.

According to the present invention, an apparatus is provided for simulating and monitoring a respiration pattern of a human. The apparatus generally includes a reservoir having an outlet, an actuator disposed in the reservoir for moving fluid in and out of the reservoir, and a control unit coupled to the actuator for controlling the actuator to simulate and monitor a respiration pattern of a human.

Figure 1:
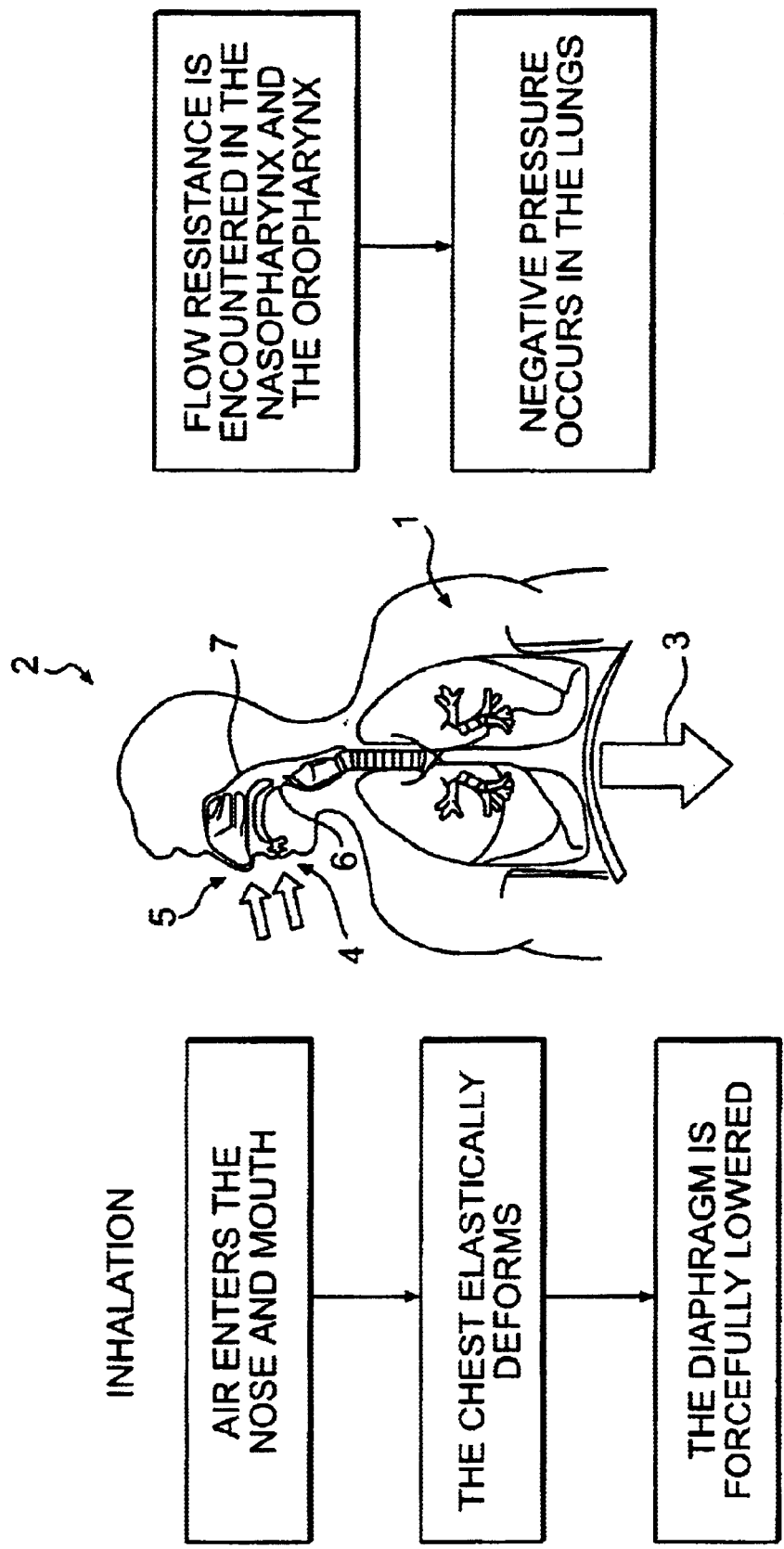
FIG. 1 is a schematic diagram of a human body illustrating an inhalation mechanism.
Figure 2:
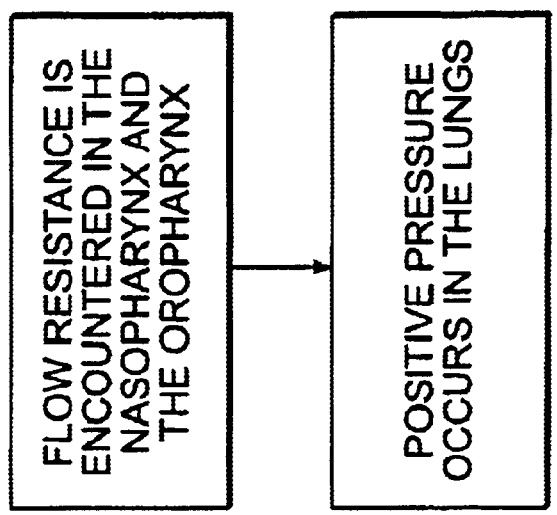
FIG. 2 is a schematic diagram of a human body illustrating an exhalation mechanism.
Figure 2:
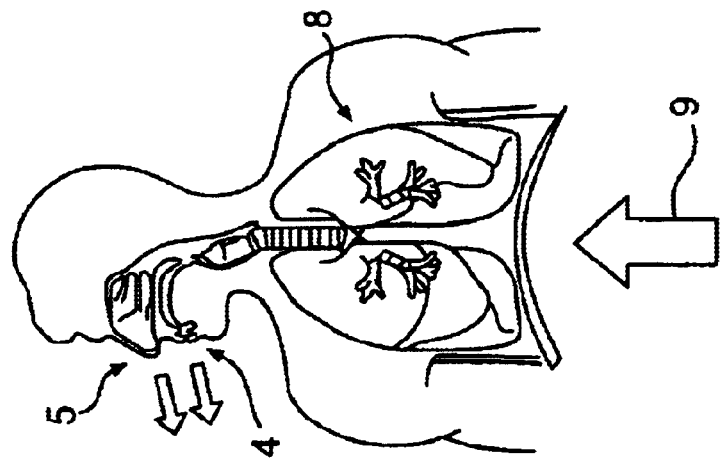
Figure 2:
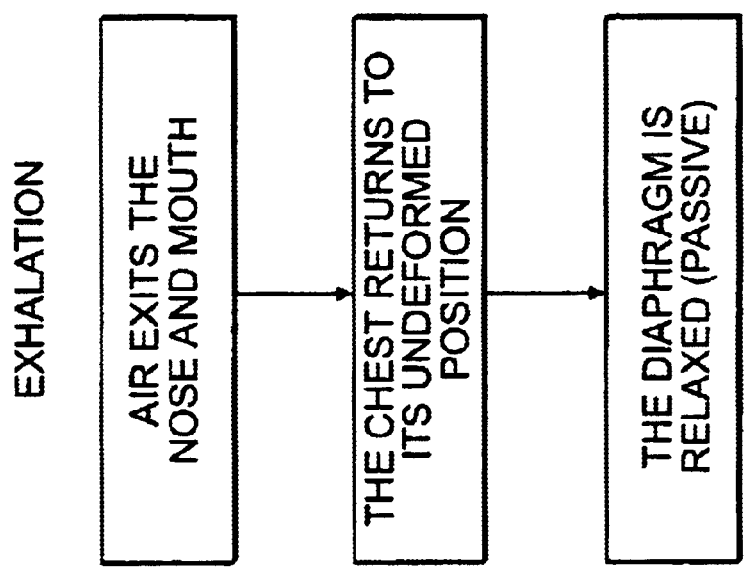
Figure 3:
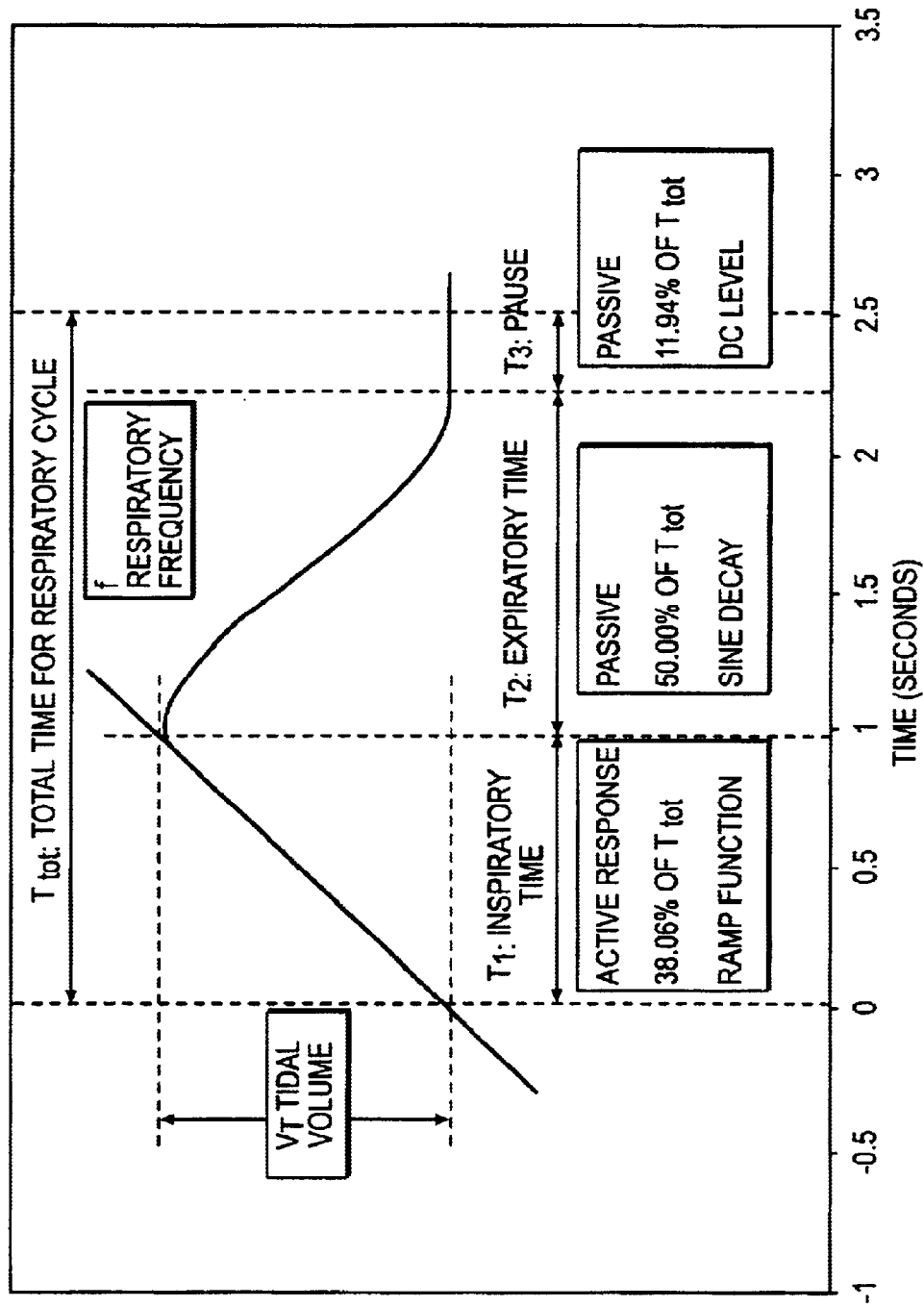
FIG. 3 is a graph illustrating a respiratory cycle of a human.
Figure 4:
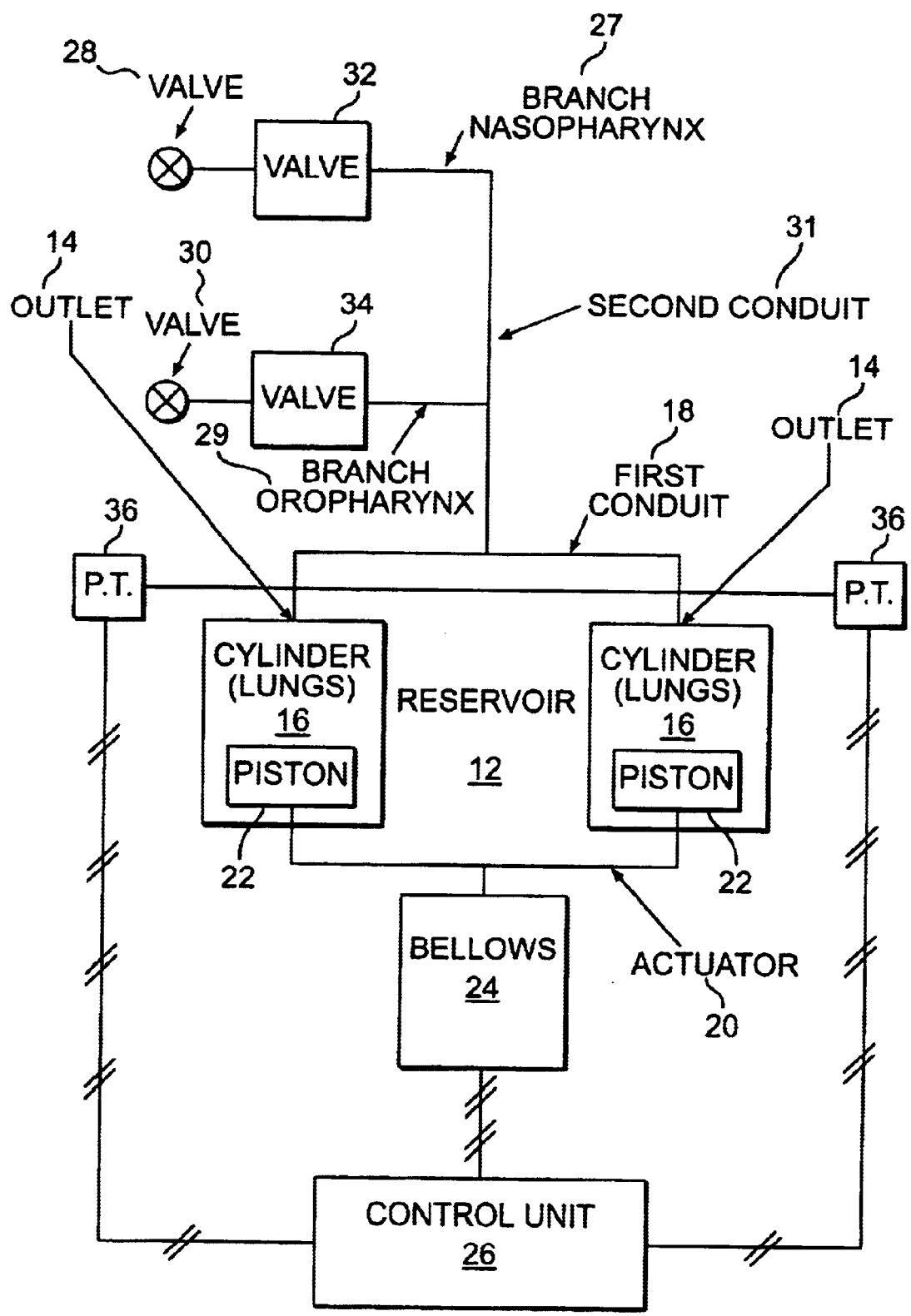
FIG. 4 is a schematic diagram of an apparatus for simulating and monitoring a respiration part of a human according to one embodiment of the invention.

As shown in FIG. 4, an apparatus 10, representing one embodiment of the invention, includes a reservoir 12 having an outlet 14. In the illustrated embodiment, the reservoir 12 has a pair of cylinders 18 connected in parallel by a first conduit 18. Each of the cylinders 16 has the outlet 14 in fluid communication with the first conduit 18. The pair of cylinders 16 correspond to lungs in a human body. In one exemplary embodiment, the cylinder 16 has a capacity of 1000 mL in order to sufficiently simulate a wide range of a human lung capacity.

The apparatus 10 also includes an actuator 20 disposed in the reservoir 12 for moving the fluid, such as air, in and out of the reservoir 12. The actuator 20 functions as the diaphragm in the human body. In the exemplary embodiment shown in FIG. 4, the actuator 20 includes a piston 22 disposed in each of the cylinders 18 and the piston 22 in each cylinder is connected a linear actuator unit 24. The piston 22 moves the fluid or air in and out of the cylinders 16 through the outlet 14. The linear actuator unit 24 may be any suitable actuator capable of exerting a mechanical force on the pistons 22 based on an electrical signal.

In the illustrated embodiment, the apparatus 10 may be provided with a valve in fluid communication with the outlet 14 of the reservoir 20, the first conduit 12, and a second conduit 31 fluidly coupled with the fit conduit 18. As shown in FIG. 4, the second conduit 31 is divided into two branch passages 27, 29 at one end. The branch passage 27 corresponds to nasopharynx, and the branch passage 29 corresponds to oropharynx. A first open/close valve 28 is disposed at the end of the one passage 27, and a second open/close valve 30 is disposed at the end of the other passage 29. The first and second open/closed valves 28, 30 can be adjusted to simulate a respiratory pattern of a human for nasal only, oral only, or nasal plus oral breathing. For example, infants usually breathe through their nasal passages. Thus, when a respiratory pattern of an infant is simulated by the apparatus 10, the first valve 28 may be open and the second valve 30 may be closed. The first and second valves 28, 30 can be any type of valve suitable for opening and closing the end of the second conduit 31.

The apparatus 10 may also include a valve in the second conduit 31 to provide fluid flow resistance through the second conduit 31. In FIG. 4, for example, the apparatus 10 has first and second needle valves 32, 34 in each branch passage of the second conduit 31. The first needle valve 32 provides flow resistance at the nasopharynx, and the second needle valve 34 provides flow resistance at the oropharynx. By adjusting the fluid or air flow through the valves 32, 34, flow resistance encountered in the nasopharynx and oropharynx in a human body can be simulated. The first and second valves 32, 34 should not be limited to a needle valve. Any other type of valve capable of regulating the fluid flow through the branch passages 27, 29 can be used. As described above, the first and second open/close valves 28, 30 and the first and second needle valves 32, 34 can control a flow rate of the fluid through the branch passages 27, 29 to and from the reservoir 12.

In one exemplary embodiment, the apparatus 10 nay include a pressure transducer 36 in fluid communication with the reservoir 12. As shown in FIG. 4, the apparatus 10 has a pair of pressure transducers 36. Each of the pressure transducers 36 is in fluid communication with each of the cylinders 16. The pressure transducers 36 can sense pressure in each of the cylinders 16 and send an electrical signal corresponding to the sensed pressure in real time. In one embodiment, the pressure transducers 36 measure differential pressure between the cylinders 16 and the ambient.

The apparatus 10 also includes a control unit 26 electrically coupled to the actuator 20 and the pressure transducers 36 for controlling the actuator 20 to simulate a respiration pattern of a human and for monitoring the respiration pattern. As illustrated in FIG. 4, the control unit 26 is electrically coupled to the linear actuator 24 and the pressure transducers 36.

Figure 5:
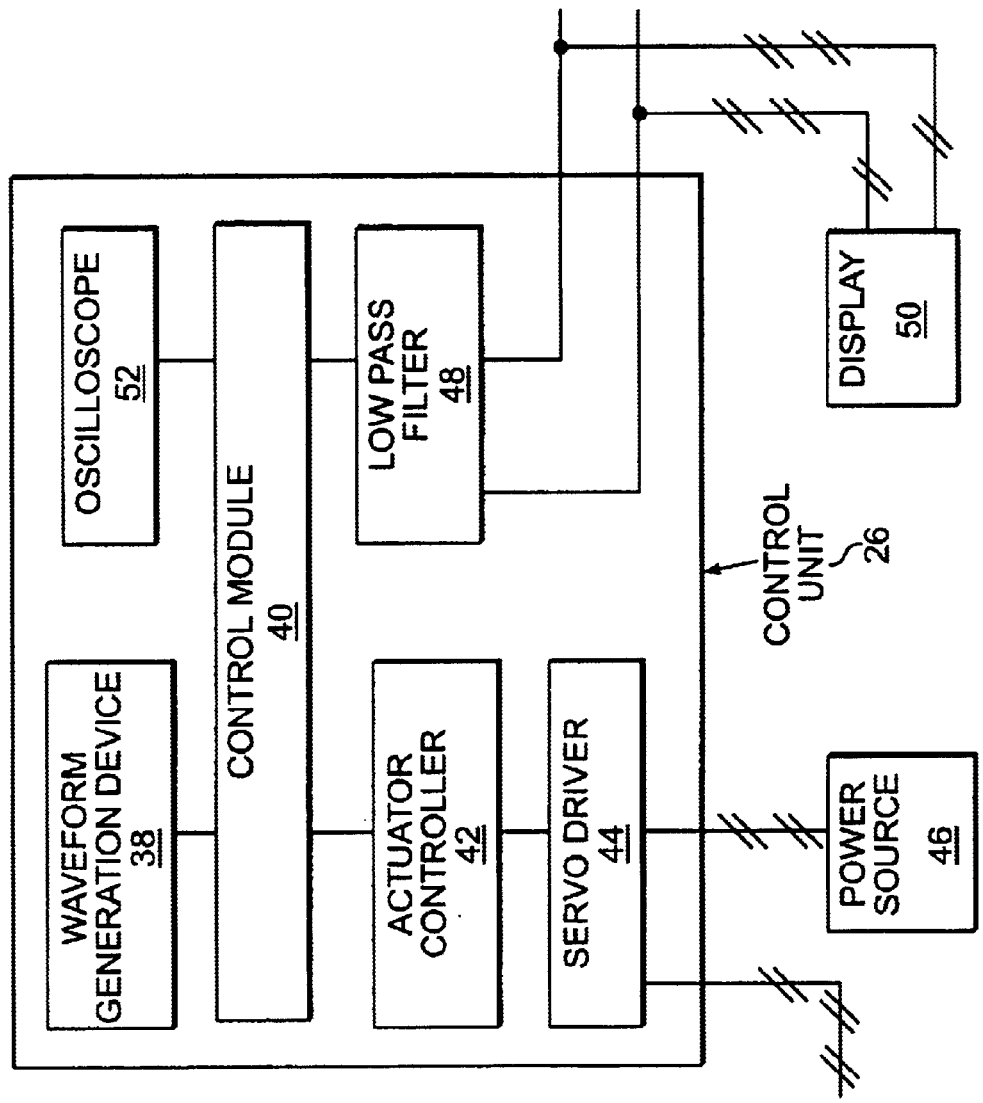
FIG. 5 is a schematic diagram of a control unit according to one embodiment of the invention.

FIG. 5 illustrates a schematic diagram of the control unit 26. The control unit 26 may be implemented by a hardware unit or by software stored in a personal computer or any other suitable platform. In one exemplary embodiment, the control unit 26 includes a waveform generation device 38 for generating a waveform defining a respiration pattern. The control unit 26 controls the actuator 20 based on the waveform to simulate a respiration pattern of a human. The waveform generation device 38 may be an arbitrary waveform generator capable of creating a wide range of waveform signals from certain inputs. The waveforms can be readily edited by altering the inputs.

Figure 6:
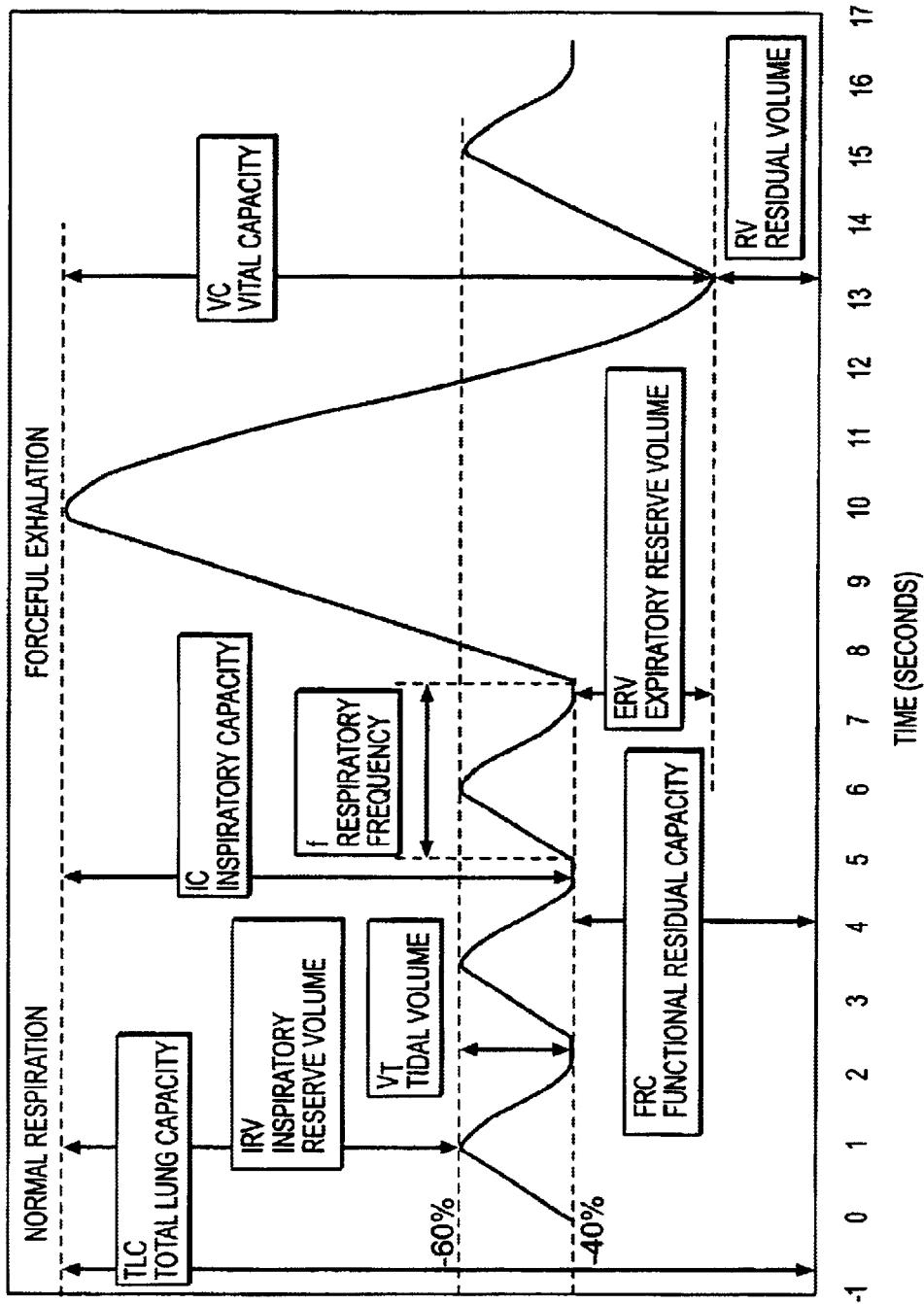
FIG. 6 is a graph showing one exemplary respiration pattern of a human.

In one exemplary embodiment, the inputs to the waveform generator device 38 may be variables to create the waveforms. The variables represent human respiratory characteristics and include a total lung capacity, a residual volume, a functional residual capacity, a tidal volume, a vital capacity, and any other variables suitable for creating a respiration pattern. Some of the variables are indicated in a respiration pattern illustrate in FIG. 6. Exemplary values for the variables are shown based on an age of the infant or child in FIG. 7. These variables represent human respiratory characteristics.

The variables representing human respiratory characteristics may be inputted to simulate a desired respiration pattern. The variables may be entered through a user interface, such as a program window on a personal computer, into the control unit 26. In another embodiment, the human respiratory characteristics are prestored in a memory of the control unit 26. For example, basic respiratory characteristics of children, as shown in FIG. 7, may be stored based on their age. When a user inputs a desired age of a child, the control unit 26 may create the basic respiration pattern of a child at the age. The basic respiration pattern may be altered if the user wishes to do so.

The control unit 26 may also include a data acquisition and control module 40 coupled to the waveform generation device 38. The data acquisition and control module 40 may be used to monitor and record maximum and minimum peak pressures, i.e., positive and negative pressures corresponding to inhalations and exhalations. In one embodiment the control unit 26 nay be capable of sampling the differential pressure ten times per second.

The data acquisition and control module 40 is coupled to a linear actuator controller 42 for controlling a servo driver 44. The servo driver 44 may receive a power supply from a power source 46 and sends a signal to the actuator 20. Based on the signal, the actuator 20 moves the pistons 22 to simulate a desired respiration pattern.

In one exemplary embodiment as shown in FIG. 5, the control unit 26 includes a low pass filter 48 that is electrically coupled to the pressure transduces 36. Pressure signals from the pressure transducers 36 are fed to the low pass filter 36. In the low pass filter 36, high frequency signals in the prepare signals are removed at a cutoff frequency. The cut-off frequency may be altered.

As shown in FIG. 5, the control unit 28 may also be coupled to a visual display 50. The visual display 50 displays the pressure signals from the pressure transducers to monitor the respiratory pattern so that the user can view the respiratory pattern.

Figure 8:
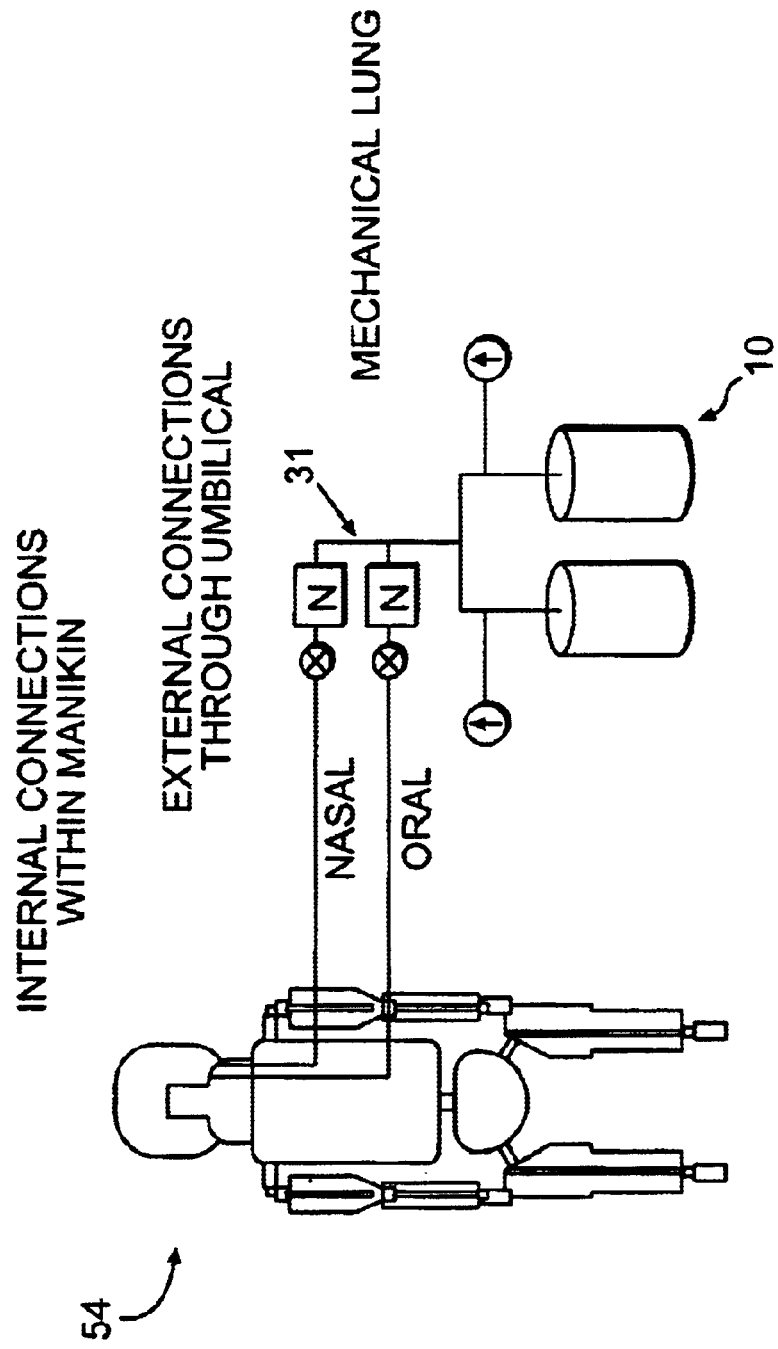
FIG. 8 is a schematic diagram of a manikin connected to an apparatus according to one embodiment of the invention.

The filtered signal from the low pass filter 48 is then fed to the data acquisition control module 40 and into an oscilloscope 52. The oscilloscope 52 displays variations in a fluctuating electrical quantity of the signal, FIG. 8 illustrates the apparatus 10 coupled to a manikin according to one embodiment of the invention. As shown in FIG. 8, the manikin 54 has an internal connection to accommodate the second conduit 31 of the apparatus 10. A respiration pattern of a human, especially a child or infant, can be accurately simulated and monitored in this manner.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for simulating and monitoring a respiration pattern of a human, comprising:
    a reservoir having an outlet leading to two passageways, wherein the two passageways represent a nasopharynx passageway and an oropharynx passageway;
    an actuator disposed in the reservoir for moving fluid in and out of the reservoir; and
    a control unit electrically coupled to the actuator for controlling the actuator to simulate a respiration pattern of a human.

2. The apparatus of claim 1, wherein the reservoir has a pair of cylinders connected in parallel by a conduit.

3. The apparatus of claim 1, wherein the actuator includes a piston disposed in the reservoir.

4. The apparatus of claim 1, further including a valve in fluid communication with the outlet of the reservoir, the valve being configured to control a flow rate of the fluid to and from the reservoir.

5. The apparatus of claim 1, wherein the control unit includes a waveform generation device for generating a waveform defining the respiration pattern.

6. The apparatus of claim 5, wherein the control unit controls the actuator based on the waveform to simulate the respiration pattern.

7. The apparatus of claim 6, wherein the waveform generation device generates the waveform based on human respiratory characteristics.

8. The apparatus of claim 7, wherein the human respiratory characteristics are prestored in the control unit.

9. The apparatus of claim 7, wherein the human respiratory characteristics may be inputted to simulate a desired respiration pattern.

10. The apparatus of claim 1, further including a pressure transducer in fluid communication with the reservoir and electrically coupled to the control unit.

11. The apparatus of claim 10, wherein the control unit monitors the respiration pattern through the pressure transducer.

12. The apparatus of claim 11, wherein the control unit includes a data acquisition module to store the monitored respiration pattern.

13. An apparatus for simulating and monitoring a respiration pattern of a human, comprising:
    a reservoir having an outlet leading to two passageways;
    an actuator disposed in the reservoir for moving fluid in and out of the reservoir; a control unit electrically coupled to the actuator for controlling the actuator to simulate a respiration pattern of a human; and
    a first valve in each of the two passageways.

14. The apparatus of claim 13, wherein the first valve in each of the two passageways are open/close valves disposed at an end thereof and are adjustable to simulate a respiratory pattern for nasal only, oral only, or nasal and oral breathing.

15. The apparatus of claim 13, further comprising a second valve in each of the two passageways, the second valve provides fluid flow resistance in each of the two passageways representing resistance at the oropharynx and nasopharynx.

16. The apparatus of claim 15, wherein the second valve is a needle valve.

* * * * *